Aug. 19, 1958     J. M. PUDDY     2,848,074
AUXILIARY BRAKES FOR TRAILERS
Filed Dec. 5, 1955
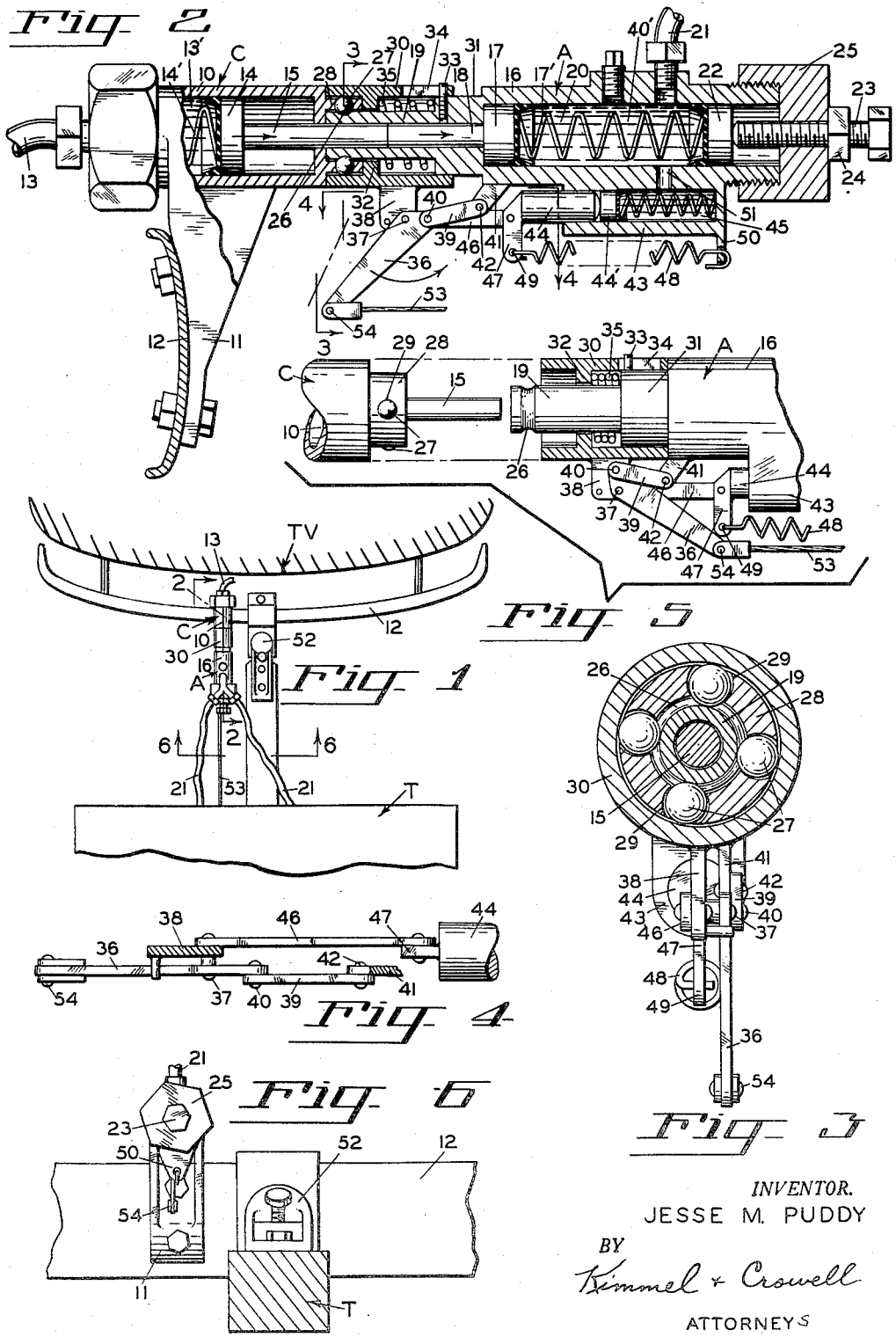
INVENTOR.
JESSE M. PUDDY
BY Kimmel + Crowell
ATTORNEYS United States Patent Office 2,848,074
Patented Aug. 19, 1958

2,848,074

AUXILIARY BRAKES FOR TRAILERS

Jesse M. Puddy, Hood River, Oreg.

Application December 5, 1955, Serial No. 551,049

3 Claims. (Cl. 188—112)

This invention relates to brake applicators for trailers and is particularly adapted to hydraulic brake systems on each vehicle.

The primary object of this invention is to cause the actuation of the hydraulic brakes on the trailer vehicle by the action of the brake system of the tractor vehicle indirectly.

This is accomplished by providing a special hydraulic cylinder associated with the trailer brakes which is adapted to receive its compression from the hydraulic pressure developed within the hydraulic brake system of the tractor vehicle.

Another object of this invention is to provide means of applying the brakes to the trailer in the event the trailer should become disconnected from the tractor vehicle.

A further object of the invention is to provide an automatic means of releasing the hydraulic cylinder of the trailer from the hydraulic connection of the tractor vehicle if the trailer hitch should accidentally become disconnected.

A still further object of the invention is to provide means within the trailer brake system of regulating the amount of brake application applied to the trailer brakes corresponding to the weight of the load carried by the trailer, controlled by the weight of the load carried by the trailer.

Other and further objects and advantages of this invention will become more apparent from a consideration of the following specification when read in conjunction with the annexed drawing, in which:

Figure 1 is a fragmentary plan view of the rear of the tractor vehicle and the forward end of the trailer, illustrating my new and improved hydraulic trailer brake applicator mounted thereon.

Figure 2 is a fragmentary longitudinal cross section taken on the line 2—2 of Figure 1, looking in the direction of the arrows, illustrating the brake applicator connection to the brake systems of the trailer and tractor vehicles.

Figure 3 is an enlarged transverse section taken on the line 3—3 of Figure 2, looking in the direction of the arrows.

Figure 4 is a fragmentary enlarged detailed section taken on the line 4—4 of Figure 2, looking in the direction of the arrows, illustrating the locking mechanism for holding the trailer brake applicator to the tractor brake assembly.

Figure 5 is an exploded fragmentary side elevation, shown partially in section, illustrating the hydraulic brake applicator of the tractor and the brake applicator of the trailer being connected or disconnected.

Figure 6 is a transverse cross sectional view looking in the direction of the arrows towards the tractor vehicle, taken on the line 6—6 of Figure 1, illustrating the brake applicator connection and the position of the trailer tongue in relation to one another.

Referring now to the drawing in detail wherein like reference numerals indicate like parts throughout the several figures, the reference numeral TV indicates generally the tractor vehicle, while the trailer is generally indicated by the letter T. Fixedly secured to the tractor vehicle TV is a connector generally indicated at C, consisting of a fluid cylinder 10. The cylinder 10 is connected by a bracket 11 to the bumper 12. The cylinder 10 is connected to a hydraulic pipe line 13 leading from the brake system of the tractor vehicle. A piston 14 operates within the cylinder 10 and has a plunger 15 associated therewith. The object of the plunger 15 is to engage and operate the mechanism within a hydraulic trailer brake applicator generally indicated at A.

The applicator A consists of a cylindrical body 16. Operating within this cylinder 16 is a piston 17. A plunger 18 is secured to the piston 17 and is slidably mounted within a reduced neck 19 forming part of the cylinder 16. Hydraulic fluid is contained within the chamber 20 of the cylinder 16. This fluid is adapted to be forced into the brake lines 21 leading to the brakes (not shown) of the trailer T.

A floating piston 22 is positioned by an adjusting screw 23 within the cylinder 16, the purpose of which is to adjust the amount of brake application to be applied to the trailer brakes in a manner to later be described. The adjusting screw 23 is locked in adjusted position by the lock nut 24 engaging the cylinder head 25. The piston 22 and the power piston 17 are maintained separated from one another under normal conditions by the spring 17′.

Formed around the neck 19 is an annular groove 26, which is adapted to receive balls 27 retained within a neck 28 formed on the rear of the cylinder 10 of the connector C. The balls 27 are loosely fitted within the sockets 29 of the neck so that they move radially from the center of the same.

A sleeve 30 is slidably telescoped over an enlarged neck 31 of the cylinder 16 of the trailer applicator A at its one end, and is slidably mounted by an inner annular shoulder 32 to the neck 19 at its opposite end. This sleeve 30 is maintained on the neck 31 by a slotted guideway 34 which engages a pin 33, the pin 33 being threaded into the neck 28. A spring 35 bears against the shoulder 32 at its one end, and against the neck 31 of the applicator A at its opposite end, the purpose of which will later be described.

When the sleeve is in the position shown in Figure 5, the neck 28 of the connector C can be inserted over the neck 19 allowing the balls 27 to enter the groove 26 after which the sleeve 30 is slid over the balls 27, maintaining them in the groove 26 and locking the brake applicator A of the trailer T to the connection C of the tractor vehicle TV. Simultaneously, the plunger 15 of the connection C is projected into the neck 19 of the applicator A against the plunger 18, which is in connection with the piston 17.

A lever 36 is pivotally connected to the sleeve 30 at 37 by a bracket 38, which forms part of the sleeve 30. A link 39 is pivotally connected to the lever 36 at 40 at its one end, and to the bracket 41 forming part of the brake applicator A at its opposite end at 42. When this lever 36 is in the position shown in Figure 2, it will force the sleeve 30 over the balls 27 holding them in the groove 26. It will be noted that the connection 40 has passed beyond the center of the pivots 37 and 42 holding the lever 36 in this position under normal conditions.

An auxiliary hydraulic cylinder 43 forms part of the applicator A and has a plunger 44 operating therein against the piston 44′ which operates against the brake fluid 45. This plunger is connected by a link 46 to the bracket 38 at 37 at its one end and to the cross head 47 forming part of the piston 44 at its opposite end. The cross head 47 extends downwardly and has a spring 48 connected thereto at 49. The opposite end of the spring 48 is connected to the bracket 50. This spring 48 tends to pull the plunger 44 against the piston 44' and the fluid 45. This fluid 45 is then forced into the chamber 20 by way of the port 51 applying the trailer brakes if the trailer T should become disconnected from the tractor TV.

The lever 36 is maintained in the position shown in Figure 2 by the tension of the spring 48 until the trailer T becomes disconnected, as for instance by trailer hitch 52 coming loose or for any other reason. A cable 53 is connected to the lever 36 at 54 at its one end, and to the trailer T at its opposite end. If the trailer T becomes separated, this cable 53 will pull the lever 36 to the position shown in Figure 5. This will permit the plunger 44 to apply the brakes on the trailer T as above described, and at the same time it will pull the sleeve 30 to the position shown in Figure 5, allowing the balls 27 to disconnect themselves from the groove 26 of the neck 19 of the trailer brake applicator A.

I will now further describe the operation of this new and improved trailer brake applicator A. When the applicator A is connected to the connector C after the trailer hitch 52 has been connected, the sleeve 30 will be forced forward over the balls 27, locking them in the grooves 26 of the neck 19 in the position shown in Figures 1, 2, 3 and 4. This will withdraw the plunger 44, releasing the brakes on the trailer T. The lever 36 will be brought to the position shown in Figure 2, forcing the sleeve forward, the point 40 passing beyond the center of the line between the point 37 and the point 42 of the brackets 38 and 41. The spring 48 will tend to hold the lever 36 in this position until the cable 53 is pulled or the lever 36 otherwise is moved to the position shown in Figure 5 for disconnecting the trailer T either purposely or for accidental reasons.

When the operator of th tractor vehicle TV applies his brakes, hydraulic brake fluid 13' contained within the cylinder 10 of the connector C will force the piston 14 in the direction of the arrow, its plunger 15 forcing the plunger 18 of the piston 17 in the direction of the arrow forcing the fluid 40' contained within the cylinder 16 of the applicator A into the brake lines 21, applying the brakes to the trailer T.

The fluid 13' within the brake system of the tractor TV and the fluid 40' within the applicator of the trailer T are completely separate, there being no fluid connection therebetween, the plunger 15 of the connector C alone operating the plunger 18 of the brake applicator A, therefore if the applicator A is separated from the connector C there will be no leakage of the fluid from the tractor vehicle TV or the trailer T.

The amount of brake application applied to the trailer T can be adjusted by the adjusting screw 23 within the applicator A against the floating piston 22. This adjustment will depend upon the weight and load carried by the trailer T, the adjustment being determined when this load is known. The amount of pressure exerted by the plunger 44 when the trailer T brakes are applied will be sufficient to brake the movement of the trailer T, but not sufficient to slide the wheels, therefore the trailer T will come to a safe stop.

Having thus described the preferred embodiment of the invention, it should be understood that numerous modifications and structural adaptations may be resorted to without departing from the scope of the appended claims.

What is claimed is:

1. A tractor trailer brake system comprising a hydraulic brake system on the tractor vehicle, a conduit extending rearwardly from said tractor vehicle hydraulic brake system, a cylinder supported at the rear of said tractor vehicle and communicating with said conduit, a piston mounted for reciprocation in said cylinder, a piston rod projecting rearwardly from said piston through the end wall of said cylinder, a hydraulic brake system on said trailer, a second cylinder operatively connected to said hydraulic brake system of said trailer and positioned forwardly of said trailer in axial alignment with said first cylinder on said tractor vehicle, a second piston mounted for reciprocation in said second cylinder, a second piston rod extending forwardly from said second piston, means connecting said first and second cylinders in end to end relation with said first and second piston rods in abutting relation whereby movement of said first piston will move said second piston, a floating piston in said second cylinder arranged oppositely to said second piston, and means on said second cylinder for adjusting the position of said floating piston.

2. A device as claimed in claim 1 wherein a third cylinder is positioned adjacent said second cylinder in communication therewith, a third piston in said third cylinder, and means carried by said second cylinder for releasing said connecting means and actuating said third piston.

3. A device as claimed in claim 1 wherein resilient means are provided for normally biasing said second piston and said floating piston apart.

References Cited in the file of this patent

UNITED STATES PATENTS

| | | |
|---|---|---|
| 1,507,390 | Loughead | Sept. 2, 1924 |
| 1,637,612 | Hundemer | Aug. 2, 1927 |
| 1,873,304 | De Mooy | Aug. 23, 1932 |
| 2,153,111 | Watson | Apr. 4, 1939 |
| 2,184,042 | Harrington | Dec. 19, 1939 |
| 2,236,247 | Kolb | Mar. 25, 1941 |
| 2,708,589 | Masek | May 17, 1955 |